US012673565B2

(12) United States Patent　　　　(10) Patent No.:　US 12,673,565 B2
Cesiel et al.　　　　　　　　　　　(45) Date of Patent:　　　Jul. 7, 2026

---

(54) SMART VEHICLE SYSTEMS AND CONTROL LOGIC WITH DARK START FUNCTIONALITY FOR VEHICLE-TO-HOME BACKUP POWER

(71) Applicant: GM GLOBAL TECHNOLOGY OPERATIONS LLC, Detroit, MI (US)

(72) Inventors: Douglas S. Cesiel, Farmington, MI (US); Samantha Gunter Miller, Berkley, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 51 days.

(21) Appl. No.: 18/652,025

(22) Filed: May 1, 2024

(65) Prior Publication Data

US 2025/0340137 A1　　Nov. 6, 2025

(51) Int. Cl.
　*B60L 53/14*　　　　(2019.01)
　*B60L 55/00*　　　　(2019.01)
　*H02J 3/32*　　　　(2026.01)
(52) U.S. Cl.
　CPC ............... *B60L 53/14* (2019.02); *B60L 55/00* (2019.02); *H02J 3/322* (2020.01)
(58) Field of Classification Search
　CPC ...................................................... B60L 53/14
　See application file for complete search history.

(56) References Cited

U.S. PATENT DOCUMENTS

| | | |
|---|---|---|
| 6,275,004 B1 | 8/2001 | Tamai |
| 10,688,881 B2 | 6/2020 | Tarnowsky |

(Continued)

FOREIGN PATENT DOCUMENTS

| | | | |
|---|---|---|---|
| DE | 102024135736 A1 | 6/2025 | |
| EP | 2204894 A1 * | 7/2010 | ............ B60W 20/13 |

(Continued)

OTHER PUBLICATIONS

NPL, Jin Xin, Challenges and Opportunities for Transactive Control of Electric Vehicle Supply Equipment. A Reference Guide, osti.gov, U.S. Department of Energy Office of Scientific and Technical Information 2015. (Year: 2015).*
Machine translation of WO-2023205304-A1.*
Machine translation of EP-2204894-A1.*
Machine translation of JP-4539785-B2.*

*Primary Examiner* — Jean Paul Cass
(74) *Attorney, Agent, or Firm* — Quinn IP Law

(57)　　　　　　　ABSTRACT

Presented are intelligent vehicle systems for provisioning backup power to buildings during power outages, methods for making/using such systems, and vehicles equipped with such systems. A method of operating a vehicle includes a resident or remote vehicle controller detecting a charging port of the vehicle coupling to a charging plug of an electric vehicle supply equipment (EVSE). Responsive to the charging plug coupling to the charging port, the vehicle controller detects a power outage of a main power supply to the EVSE. Upon detecting the power outage, the controller responsively commands a vehicle battery assembly to discharge an auxiliary power feed to the EVSE. After discharging the auxiliary power feed to the EVSE, the controller determines if the vehicle is communicating with the EVSE; if so, the vehicle controller responsively commands the vehicle battery assembly to discharge a backup power feed, greater than the auxiliary power feed, to the EVSE.

19 Claims, 3 Drawing Sheets

(56) References Cited

U.S. PATENT DOCUMENTS

| | | | |
|---|---|---|---|
| 11,091,055 B2 | 8/2021 | Tarchinski | |
| 11,827,117 B2 | 11/2023 | Khamis et al. | |
| 2012/0181854 A1 | 7/2012 | Gopalakrishnan et al. | |
| 2016/0285296 A1 | 9/2016 | Namou et al. | |
| 2020/0353839 A1* | 11/2020 | Tarchinski | B60L 53/62 |
| 2021/0252990 A1 | 8/2021 | Chih-Lun | |
| 2022/0024332 A1* | 1/2022 | Powell | B60L 58/20 |
| 2022/0161676 A1 | 5/2022 | Marlow et al. | |
| 2022/0185137 A1 | 6/2022 | Cesiel et al. | |
| 2023/0264594 A1 | 8/2023 | Nergaard et al. | |
| 2024/0075826 A1 | 3/2024 | Miller et al. | |
| 2025/0236197 A1* | 7/2025 | Galang | B60L 53/62 |
| 2025/0303915 A1* | 10/2025 | Lu | B60L 55/00 |

FOREIGN PATENT DOCUMENTS

| | | | | |
|---|---|---|---|---|
| EP | 3326703 B1 * | 11/2020 | | A63H 33/04 |
| JP | 4539785 B2 * | 9/2010 | | B60L 53/24 |
| KR | 20120135509 A * | 12/2012 | | G06Q 30/0601 |
| WO | WO-2023205304 A1 * | 10/2023 | | H01R 31/06 |

* cited by examiner

SMART VEHICLE SYSTEMS AND CONTROL LOGIC WITH DARK START FUNCTIONALITY FOR VEHICLE-TO-HOME BACKUP POWER

INTRODUCTION

The present disclosure relates generally to electric-drive motor vehicles. More specifically, aspects of this disclosure relate to smart vehicle systems and methods for provisioning vehicle-to-home connectivity for "dark start" home backup power.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively high energy density, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on fossil-fuel based engines for tractive power.

A full-electric vehicle (FEV)—colloquially identified as an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, rechargeable battery cells, and battery cooling and charging hardware in a battery electric vehicle. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

High-voltage (HV) electrical systems govern the transfer of current between each traction motor and the rechargeable energy storage system that supplies the requisite power for operating electric-drive vehicles. For battery-electric vehicles (BEV), the RESS is generally composed of one or more high-energy density, high-capacity traction battery packs with rechargeable battery cells that are packaged inside a shared pack housing or segregated into individual battery modules. Located on a battery side of the HV electrical system is a front-end DC-to-DC power converter that increases the voltage level of current supplied by the traction battery pack(s) to a main DC bus and a DC-to-AC power inverter module (PIM). The traction PIM is an electronic switching device for converting the DC output of the battery pack(s) into an alternating current (AC) input for powering the multi-phase traction motor(s) using, for example, pulse width modulated (PWM) control signals. A high-frequency bulk capacitor may be arranged across the positive and negative rails of the main DC bus to provide electrical stability and store supplemental electrical energy. A dedicated Electronic Battery Control Module (EBCM), through collaborative operation with a Powertrain Control Module (PCM) and each motor's power electronics package, governs operation of the battery pack(s) and traction motor(s).

As electric-drive vehicles become more prevalent, infrastructure is being developed and deployed to make day-to-day use of such vehicles feasible and convenient. Electric vehicle supply equipment (EVSE) for recharging electric-drive vehicles comes in many form factors, including residential electric vehicle charging stations (EVCS) that are purchased and operated by a vehicle owner (e.g., installed in the owner's garage), publicly accessible EVCS offered by private retailers (e.g., at commercial charging facilities), and advanced high-voltage, fast-charging stations used by manufacturers, dealers, and service stations (e.g., multi-coupler 360+ kW superchargers). Plug-in-type hybrid and electric automobiles, for instance, may be recharged by physically connecting a charging cable of the EVSE to a complementary charging port of the vehicle. Vehicle electrification presents an opportunity, through bidirectional charging infrastructure and strategy, to contribute to the capacity and reliability of public power grids. For instance, electric-drive vehicles may provide backup power during a grid power outage through participation in vehicle grid integration (VGI) activities by supporting two-way reverse power flow (RPF) between the vehicle's battery system and the EVSE of a residential or commercial building.

SUMMARY

Presented below are intelligent vehicle systems with control logic that provision backup power to residential or commercial buildings during power outages, methods for manufacturing and methods for operating such systems, and motor vehicles equipped with such systems. By way of illustration, a closed-loop system control method enables "dark start" of Vehicle-to-Home (V2H) backup power without the need of an in-home dark start battery (DSB) that powers the residential EVSE to solicit power from a plug-in electric vehicle (PEV). A "dark start" (or "black start") event may refer to a V2H RPF microgrid operation that instigates the supply of power from a PEV to a home during a public grid outage. Prior to initiating dark start power flow, a DSB was needed to power the residential EVCS to ensure that the EVCS is able to sense when a grid outage exists and concomitantly communicate with the PEV to request backup power. The PEV is equipped with a bidirectional DC-AC converter that outputs AC voltage at multiple amplitudes and dynamically limits AC current. The PEV mates with a charging plug of an off-board bidirectional charger; the PEV selectively supplies low-voltage AC power to the off-board charger. The off-board charger uses this low-voltage feed to supply power across an EV-side AC/DC auxiliary power converter to a microgrid interconnect device (MID) controller. In so doing, the off-board charger communicates with the MID to ascertain a grid on/off status; if the grid is off and the building is operatively disconnected from the grid, the EVSE requests EV discharge via a control pilot frequency.

Aspects of this disclosure are directed to intelligent vehicle control systems, memory-stored vehicle control protocols, and vehicle control logic for provisioning backup power to buildings during power outages. In an example, a method is presented for operating a motor vehicle that has a vehicle body, a vehicle battery assembly attached to the vehicle body, and a vehicle charging port attached to the vehicle body and electrically connected to the vehicle battery assembly. This representative method includes, in any order and in any combination with any of the above and below disclosed options and features: detecting, e.g., via a resident or remote microcontroller, control module, logic device, or network of controllers/modules/devices (collectively "controller"), a charging plug (e.g., an IEC 62196 "Type 1" plug) of an EVSE coupling to the vehicle's charging port; detecting, e.g., via the vehicle controller responsive to the detected coupling of the charging plug to the complementary charging port, a power outage of a main electric power supply (e.g., power utility grid, photovoltaic system, standalone generator, etc.) to the EVSE; commanding, e.g., via the vehicle controller responsive to the detected power outage, the vehicle battery assembly to discharge an auxiliary power feed through the mating plug and port to power the EVSE; determining, e.g., via the vehicle controller after the discharge of the auxiliary power feed to the EVSE, if the vehicle is communicatively connected to the EVSE and, thus, the EVSE is powered on and operating properly; and commanding, e.g., via the vehicle controller responsive to confirming the motor vehicle is able to communicate with the EVSE, the vehicle battery assembly to discharge a backup power feed, greater than the auxiliary power feed, through the plug and port to the EVSE.

Aspects of this disclosure are also directed to computer-readable media (CRM) containing controller-executable instructions for enabling electric-drive vehicles to transmit backup power to buildings during power outages. In an example, a non-transient CRM stores instructions that are executable by one or more processors of a vehicle controller of a motor vehicle. The CRM-stored instructions, when executed by the processor(s), cause the vehicle controller to perform operations, including: detecting a coupling of a charging plug of an electric vehicle supply equipment (EVSE) to a charging port of the vehicle; detecting an occurrence of a power outage of a main electric power supply to the EVSE in response to the detected coupling of the charging plug to the charging port; commanding the battery assembly to discharge an auxiliary power feed sufficient to power the EVSE in response to the detected power outage; determining if the vehicle is communicatively connected to the EVSE after the discharge of the auxiliary power feed to the EVSE; and commanding the battery assembly to discharge a backup power feed, greater than the auxiliary power feed, to the EVSE in response to the vehicle being communicatively connected to the EVSE.

Additional aspects of this disclosure are directed to motor vehicles equipped with rechargeable energy storage systems and intelligent control systems that provide backup power to buildings during power outages. As used herein, the terms "vehicle" and "motor vehicle" may be used interchangeably and synonymously to include any relevant vehicle platform, such as passenger vehicles, commercial vehicles, industrial vehicles, off-road and all-terrain vehicles (ATV), motorcycles, farm equipment, watercraft, aircraft, etc. In an example, a motor vehicle includes a vehicle body with a passenger compartment, multiple road wheels mounted to the vehicle body (e.g., via corner modules coupled to a unibody or body-on-frame chassis), and other standard original equipment. For electric-drive applications, one or more traction motors operate alone (e.g., for FEV powertrains) or in conjunction with an internal combustion engine assembly (e.g., for HEV powertrains) to drive the road wheel(s) and propel the vehicle. A RESS with one or more traction battery packs is attached to the vehicle body and is operable to power the traction motor(s), in-vehicle accessories, heating, ventilation and air conditioning (HVAC) system, etc.

Continuing with the discussion of the foregoing example, the vehicle is also equipped with a bidirectional onboard charger (OBC), a vehicle charging port, and a vehicle controller, all of which are attached to the vehicle body. The bidirectional OBC is electrically connected to the vehicle's battery pack(s) and converts a direct current (DC) voltage output by the battery pack(s) to an alternating current (AC) voltage. The vehicle charging port, which is electrically connected to the battery pack(s) via the OBC, mates with complementary EVSE charging plugs. The vehicle controller is programmed to detect a charging plug of an EVSE coupling to the vehicle's charging port; when coupled, the controller uses the coupled EVSE charging plug to determine whether or not a main electric power supply to the EVSE is experiencing a power outage. If a power outage is detected, the controller responsively commands the traction battery pack(s) to discharge an auxiliary power feed (e.g., 24 VAC or 120 VAC) through the bidirectional OBC, the vehicle charging port, and the charging plug, to the EVSE. After discharging the auxiliary power feed, the controller determines whether or not the vehicle is now able to communicative with the EVSE; if so, the controller responsively commands the traction battery pack(s) to discharge a backup power feed (e.g., 240 VAC) through the bidirectional OBC, the vehicle charging port, and the charging plug, to the EVSE.

For any of the disclosed vehicles, methods, and CRM, detecting the coupling of a charging plug to a vehicle charging port may include sensing a change in a predefined proximity voltage transmitted through a proximity pilot (PP) pin of the charging plug (e.g., ~5 VDC drops to ~1 VDC or less). As a further option, the vehicle controller may respond to the detected coupling of the charging plug to the charging port by determining whether or not the EVSE is an in-home bidirectional EVCS with V2H discharging hardware. In another example, detecting a power outage may include sensing an absence of a control pilot (CP) signal output by the EVSE through a CP pin of the charging plug. Optionally, detecting a power outage may include sensing an absence of a charging voltage output by the EVSE through a main line pin of the charging plug to the vehicle battery assembly.

For any of the disclosed vehicles, methods, and CRM, the vehicle controller may respond to a detected power outage by determining whether or not a V2H discharging mode, which enables the discharge of a backup power feed, is activated on the motor vehicle. As another option, determining that the motor vehicle is communicatively connected to the EVSE may include receiving a CP signal output by the EVSE through a CP pin of the charging plug. In this instance, the vehicle controller may first determine a predefined CP signal time limit, then determine whether or not the CP signal is received from the EVSE prior to expiration of the predefined CP signal time limit, and disable the vehicle battery assembly from discharging the backup power feed responsive to the CP signal not being received prior to expiration of the CP signal time limit. The vehicle controller may also determine a CP frequency of the CP signal output by the EVSE, then determine if the CP frequency is not within a certain tolerance/range (e.g., exceeds a predefined CP frequency limit), and disable the battery assembly from discharging the backup power feed responsive to the CP frequency being outside the tolerance/range (e.g., exceeds the predefined CP frequency limit).

For any of the disclosed vehicles, methods, and CRM, the EVSE may transmit the auxiliary power feed discharged by the vehicle to a microgrid controller of a microgrid inter-connect device (MID). The MID is interposed between and selectively electrically connects the building and, thus, the EVSE with the main electric power supply. In this instance, the MID controller may respond to receipt of the auxiliary power feed by determining whether or not the main electric power supply to the building/EVSE is experiencing a power outage; if so, the MID controller may responsively com-mand a set of MID contactors to open and thereby electri-cally disconnect the building/EVSE from the main electric power supply. As another option, the auxiliary power feed may have a low-voltage level of about 50 volts (V) or less and a low-amperage level of about 10 amps (A) or less, whereas the backup power feed may have a high-voltage level of about 240 V or more and a high-amperage level of about 32 A or more.

The above summary does not represent every embodi-ment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
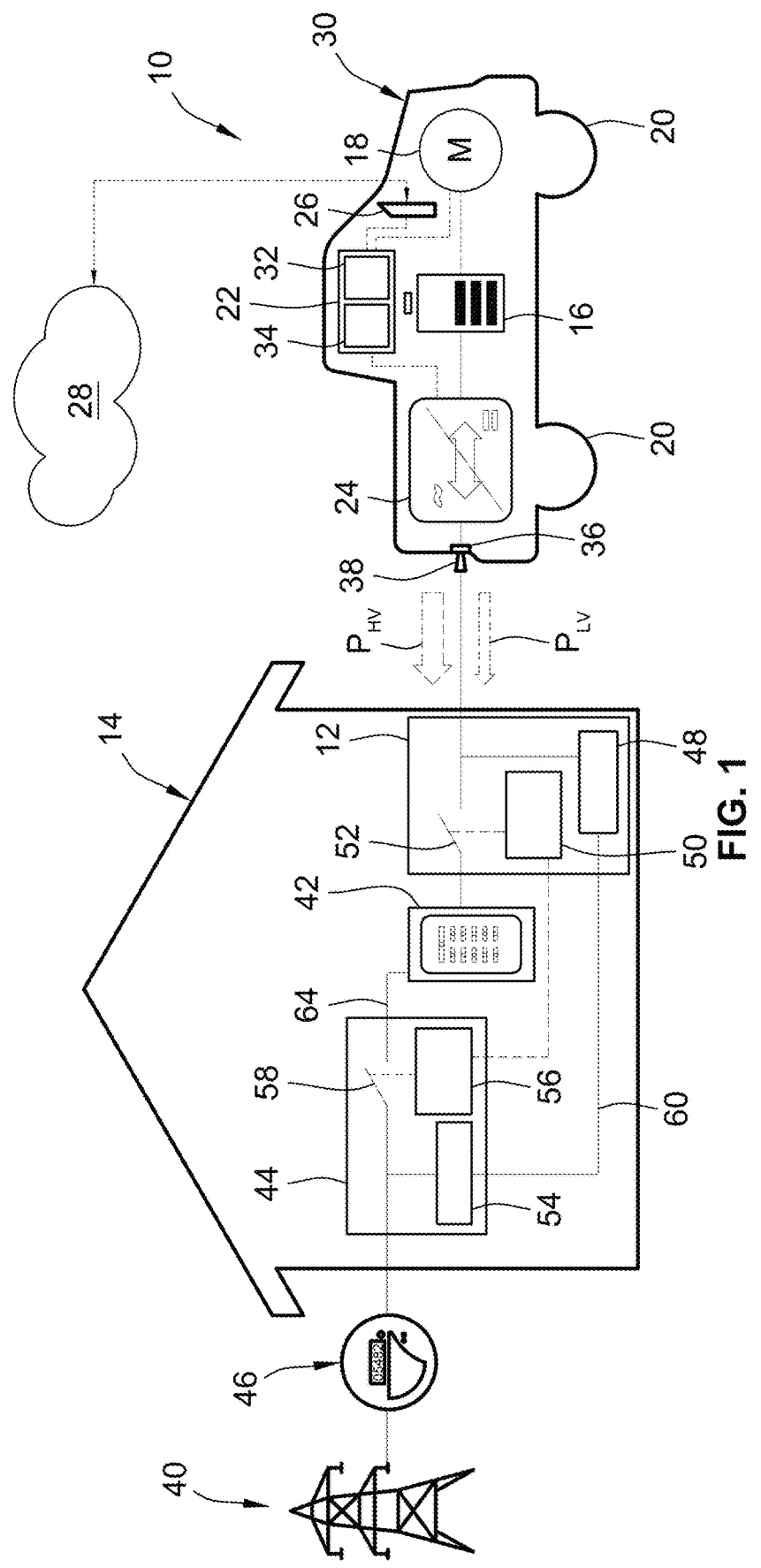
FIG. 1 is a schematic side-view illustration of a repre-sentative vehicle with an electrified powertrain, a recharge-able energy storage system, and a network of on-vehicle controllers, sensors, and communication devices for provi-sioning dark-start backup power during a power outage event in accordance with aspects of the present disclosure.

The present disclosure is amenable to various modifica-tions and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclo-sure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Descrip-tion of the Drawings, and Detailed Description sections, but not explicitly set forth in the claims, should not be incor-porated into the claims, singly or collectively, by implica-tion, inference or otherwise. Moreover, recitation of "first", "second", "third", etc., in the specification or claims is not per se used to establish a serial or numerical limitation; unless specifically stated otherwise, these designations may be used for ease of reference to similar features in the specification and drawings and to demarcate between similar elements in the claims.

For purposes of this disclosure, unless specifically dis-claimed: the singular includes the plural and vice versa (e.g., indefinite articles "a" and "an" are to be construed as meaning "one or more" unless expressly disclaimed); the words "and" and "or" shall be both conjunctive and dis-junctive; the words "any" and "all" shall both mean "any and all"; and the words "including," "containing," "comprising," "having," and the like, shall each mean "including without limitation." Moreover, words of approximation, such as "about," "almost," "substantially," "generally," "approxi-mately," and the like, may each be used herein to denote "at, near, or nearly at," or "within 0-5% of," or "within accept-able manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving sur-face.

Referring now to the drawings, wherein like reference numbers refer to like features throughout the several views, there is shown in FIG. 1 a representative motor vehicle, which is designated generally at 10 and portrayed herein for purposes of discussion as a pickup-style, electric-drive auto-mobile. The illustrated automobile 10—also referred to herein as "motor vehicle" or "vehicle" for short—is merely an exemplary application with which aspects of this disclo-sure may be practiced. In the same vein, execution of the present concepts to provide dark start backup power to a residential home during a power grid outage by a plug-in battery electric vehicle should be appreciated as a non-limiting implementation of disclosed features. As such, it will be understood that aspects and features of this disclo-sure may be implemented to power a myriad of different building types (e.g., residential, commercial, industrial, etc.), may be employed during outages of any main power supply (e.g., power utility grid, photovoltaic system, stand-alone generator, etc.), may be carried out by other RESS architectures (e.g., PEV, BEV, FCV, PHEV, etc.), and may be incorporated into any logically relevant type of vehicle. Moreover, only select components of the motor vehicle and EVSE system are shown and described in detail herein.

Nevertheless, the vehicles and systems discussed below may include numerous additional and alternative features, and other available peripheral hardware, for carrying out the various methods and functions of this disclosure.

FIG. 1 is a simplified illustration of an electric-drive vehicle 10 docked at and operably connected to an electric vehicle supply equipment (EVSE) 12 of a building 14 for recharging an onboard rechargeable energy storage system (RESS) 16 of the vehicle 10. In the illustrated example, the electric-drive vehicle 10 is a plug-in, full-electric pickup truck that is electrically coupled to a residential EVCS 12 of a family home 14 to selectively charge and discharge a high-voltage, high-energy density DC traction battery pack 16. The traction battery pack 16 may take on many suitable electric vehicle battery (EVB) form factors, including an array of lead-acid, molten-salt, nickel-metal hydride, or lithium-ion battery cells packaged inside a shared battery pack housing or segregated into individual battery modules. During normal vehicle operation, the traction battery pack 16 of FIG. 1 is electrically connected to and powers an electric motor-generator unit (MGU) 18 that drives one or more of the vehicle's road wheels 20 to thereby propel the vehicle 10. The traction battery pack 16 is communicatively connected (wired or wirelessly) to one or more resident or remote vehicle controllers, represented in FIG. 1 by electronic control unit (ECU) 22, that regulates the operation of various onboard vehicle components. The ECU 22 is also communicatively connected to a bidirectional onboard charger (OBC) 24 to control, for example, bidirectional transfer of energy between the traction battery pack 16 and EVSE 12.

With continuing reference to FIG. 1, the representative vehicle 10 is originally equipped with a vehicle telecommunication and information ("telematics") unit 26 that wirelessly communicates, e.g., via cell towers, wireless modem, V2X, satellite service, etc., with a remotely located or "off-board" cloud computing host service 28 (e.g., ONSTAR®). The telematics unit 26 may include a touchscreen video display device and assorted other output and input controls (e.g., speakers, haptics, buttons, knobs, touchpads, joysticks, etc.) that function, in part, as a human/machine interface (HMI) to enable a vehicle occupant to communicate with the telematics unit 26 and other systems and system components both resident to and remote from the vehicle body 30. Generally speaking, the telematics unit 26 is an onboard computing device that provides a mixture of services, both individually and through its communication with the ECU 22 and other networked devices. The ECU 22 may be generally composed of one or more processors 32, each of which may be embodied as a discrete microprocessor, an application specific integrated circuit (ASIC), or a dedicated control module. ECU 22 may offer centralized vehicle control as a central processing unit (CPU) that is operatively coupled to a real-time clock (RTC) and one or more electronic memory devices 34, each of which may take on the form of a CD-ROM, magnetic disk, IC device, flash memory, semiconductor memory (e.g., various types of RAM or ROM), etc.

To provide an operable coupling between the vehicle's traction battery pack 16 and the in-home EVCS 12, the vehicle 10 may include a conductive "wired" charging port 36 that mates with a complementary "plug-in" electrical connector ("charging plug") 38. This charging port 36 enables a user to easily connect and disconnect the vehicle 10 to/from a readily available AC or DC source, such as a power grid 40, via EVCS 12. The electrical connector 38 which may be one of a number of different commercially available electrical connector types, including a Society of Automotive Engineers (SAE) J1772 (Level 1) or J1772-2009 (Level 2) connector plug or International Electrotechnical Commission (IEC) 62196-2 and/or 62196-3 compatible connector plug. The charging plug 38 may operate in single-phase or split-phase modes operating at 120 to 240 volts (V) with alternating current (AC) at up to 80 amperes (A) peak current for conductive vehicle charging. The EVCS 12 may employ any heretofore and hereinafter developed type of wired and/or wireless charging technology, including inductive charging, radio charging, and resonance charging, as some non-limiting examples.

It is envisioned that the vehicle 10 may electrically connect to a variety of EVSE associated with both fixed and portable structures that draw power from any type of main power supply; the building 14 of FIG. 1, for example, is portrayed as a single-family dwelling with a garage-mounted EVCS 12 that is fed by a public utility power grid 40. The building 14 includes a main service panel (MSP) 42 that selectively electrically connects/disconnects the EVCS 12 to a microgrid interconnect device (MID) 44 which, in turn, connects the EVCS 12 to the power grid 40 via a kilowatt-Hour (kWh) type power meter 46. The MSP 42 of FIG. 1—colloquially referred to as a "breaker panel"—routes electrical power into subsidiary circuits while also providing a protective fuse or circuit breaker for each circuit in a protective enclosure. The power meter 46 is operable to monitor the amount of electric power flowing from the grid 40 to the MPS 42 and consumed by the building 14. In accord with the illustrated example, the building 14 may be characterized by a lack of fixtured dark (black) start battery that powers the EVCS 12 and/or MID 44 in the event of a power outage.

The EVCS 12, MSP 42, and MID 44 may cooperatively define a bidirectional vehicle charging system that is operable in a charging mode, e.g., for transferring electric power originating from the power grid 40 to the electric-drive vehicle 10 under predefined conditions, and a discharging mode, for transferring electric power originating from the vehicle 10 to the building 14 under other predefined conditions. To enable bidirectional power flow, the EVCS 12 contains an EVCS low-voltage power module and AC/DC power converter ("low-voltage power module") 48, an EVCS controller 50, and a main-line EVCS switch ("electrical contactor") 52. The MID 44 supports bidirectional power flow with a MID low-voltage power module and AC/DC power converter ("low-voltage power module") 54, a MID controller 56, and a main-line MID switch ("electrical contactor") 58. The EVCS's low-voltage power module 48 is interposed between and electrically connected in series with the electrical connector 38 and the MID's low-voltage power module 54 to collectively define a low-voltage (LV) circuit 60. Likewise, the MSP 42 is interposed between and electrically connected in series with the EVCS's main-line switch 52 and the MID's main-line switch 58 to collectively define a high-voltage (HV) circuit 64, which is parallel to the LV circuit 60.

With the bidirectional system architecture of FIG. 1, the EVCS 12 may solicit a low-voltage auxiliary power feed $P_{LV}$ from the battery pack 16 of vehicle 10, e.g., when the power grid 40 is experiencing an outage. When received, the EVCS's LV power module 48: (1) transmits a first metered portion of the auxiliary power feed to power the EVCS controller 50; and (2) transmits a second metered portion of the auxiliary power feed to the LV power module 54 to power the MID controller 56. Using this LV power feed, the EVCS and MID controllers 50, 56 coordinate the selective opening and closing of the EVCS's and MID's main-line switches 52, 58, respectively. Closing of both main-line switches 52, 58, for example, allows the EVCS 12 to recharge the vehicle 10 using power originating from the grid 40. Concurrently closing the EVCS's main-line switch 52 and opening and MID's main-line switches 58 allows the EVCS 12 to transmit a high-voltage backup power feed $P_{HV}$ originating from the vehicle 10 to the MSP 42.

Disclosed herein are dark start V2H RPF systems and methods that provide home backup power, e.g., without the use of a dedicated DSB. By way of example, and not limitation, a BEV equipped with a bidirectional DC-AC power converter (e.g., on-board charge module (OBCM)) electrically couples—wired or wirelessly—to a V2H-enabled EVSE. The vehicle's bidirectional power converter may be designed to step up or step down pack-generated power to form a range of AC voltages at multiple amplitudes (e.g., 240 VAC, 120 VAV, 24 VAC, etc.), while dynamically limiting discharge current (e.g., 3 A) when in a low-voltage mode and/or based on EVSE ampacity as provided by a control pilot duty cycle. The V2H-enabled EVSE (e.g., off-board bidirectional EVCS) includes a specialized proximity resistor (different from standard unidirectional EVSE) and a multi-pin charging plug device, e.g., that includes five terminals: (1) an L1 AC voltage terminal; (2) an N/L2 AC voltage terminal; (3) a ground (G) terminal; (4) a control pilot (CP) terminal; and (5) a proximity pilot (PP) voltage terminal. Additional information regarding the contents and functionalities of a mated EVCS connector plug and on-vehicle connector port may be found, for example, in U.S. Patent App. Pub. No. 2024/0075826 A1, to Miller at al., which is incorporated herein by reference in its entirety and for all purposes.

When a power outage event is detected by the BEV, the vehicle RESS may supply low-voltage AC power to the V2H-enabled EVSE and, via the EVSE, to a microgrid interconnect device. Output of this low-voltage AC power may be dependent upon a detectable variation in a proximity voltage, a lack of a control pilot signal, a lack of a vehicle-charging AC voltage present from the EVSE, and/or a user-selected activation of V2H mode on the vehicle. The EVSE may contain hardware and logic to receive the BEV's LV power feed across an internal AC/DC auxiliary (aux) power converter on the EV side of the EVSE's power contactors. The EVSE's converter supplies the LV power to the MID's internal controller while the BEV discharges AC power (e.g., at about 24 VAC to about 240 VAC). The EVSE controller communicates with the MID controller to learn grid on/off status; when the grid is off, the EVSE requests BEV discharge via a control pilot frequency (e.g., according to SAE J2847/5). The MID may contain hardware and logic functions that receive the LV power feed across an internal AC/DC aux power converter on the grid side of MID's power contactors. The MID's power converter supplies the LV power to the MID controller so that it may monitor and determine grid on/off status; the MID communicates the grid on/off status to the EVSE.

For at least some applications, it may be desirable to employ an autotransformer that is installed, for example, in the user's home and configured to receive a single-phase AC power feed from the PEV/BEV/FEV and convert the received power feed to split-phase AC power. Alternatively, a backup service panel with select 120 Vac or 240 Vac single-phase circuits may be installed in the user's home. If a backup service panel is not provided, the home user(s) may need to implement a manual load management protocol by manually opening circuit breakers for high-power unsupported loads (e.g., air conditioner unit). It is further recognized that the subject vehicle may need to be "awake" such that the vehicle controller is able to detect a proximity voltage. In this instance, the user may select V2H mode to awaken the vehicle and ensure that the vehicle controller is awake to actively monitor and measure a proximity voltage.

Figure 2:
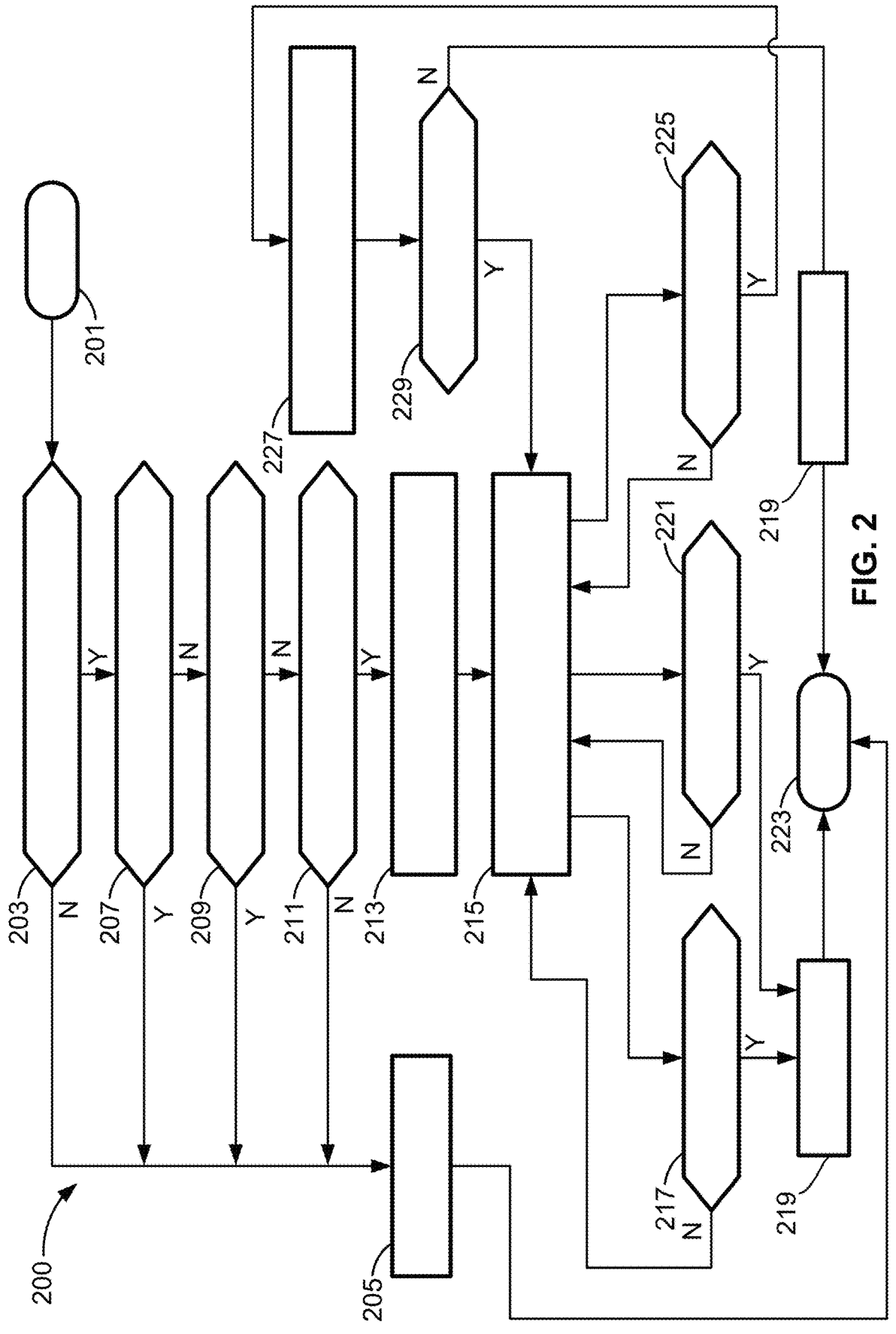
FIG. 2 is a flowchart illustrating a representative vehicle control protocol for provisioning dark-start backup power to a commercial or residential building during a power outage, which may correspond to memory-stored instructions that are executable by a resident or remote microcontroller, control-logic circuit, system control module, or other inte-grated circuit (IC) device or network of circuits/modules/microcontrollers/IC devices (collectively "controller") in accordance with aspects of the disclosed concepts.

With reference next to the flow chart of FIG. 2, an improved vehicle control strategy or method for provisioning backup power to a building, such as family home 14 of FIG. 1, by an electric-drive vehicle, such as FEV truck 10, during a power outage, such as blackout of power grid 40, is generally described at 200 in accordance with aspects of the present disclosure. Likewise, an improved EVSE control strategy or method for coordinating vehicle-provided backup power by an EVSE, such as residential EVCS 12 of FIG. 1, during a power outage is generally described at 300 in FIG. 3 in accordance with aspects of the present disclosure. Some or all of the operations illustrated in FIGS. 2 and 3 and described in further detail below may be representative of algorithms that correspond to non-transitory, processor-executable instructions that are stored, for example, in main or auxiliary or remote memory (e.g., resident memory device 34 and/or remote cloud service 28 database of FIG. 1). These instructions may be executed, for example, by an electronic controller, processing unit, dedicated control module, logic circuit, or other module or device or network of controllers/modules/devices (e.g., ECU 22 and/or EVCS controller 50 of FIG. 1), to perform any or all of the above and below described functions associated with the disclosed concepts. It should be recognized that the order of execution of the illustrated operation blocks may be changed, additional operation blocks may be added, and some of the herein described operations may be modified, combined, or eliminated.

Method 200 begins at START terminal block 201 of FIG. 2 with memory-stored, processor-executable instructions for initializing a dark start backup power mode, e.g., for a vehicle with an onboard RESS and V2H RPF functionality. This routine may be available for initialization in real-time, near real-time, continuously, systematically, and/or at predefined time intervals during operation or inactivity of the motor vehicle 10. As yet another option, terminal block 201 may initialize responsive to a user command prompt (e.g., via telematics 26 input controls), a resident vehicle controller prompt (e.g., from ECU 22), or a broadcast prompt signal received from a centralized back-office (BO) vehicle services system (e.g., from cloud host service 28). By way of non-limiting example, method 200 may initialize by presenting a vehicle occupant with a telematics touchscreen-selectable option to activate the dark start backup power mode; this user-selectable option may be presented via the telematics unit after detecting the vehicle has arrived at the user's home. Upon completion of some or all of the control operations presented in FIG. 2, method 200 may advance to END terminal block 223 and temporarily terminate or, optionally, may loop back to terminal block 201 and run in a continuous loop.

Advancing from terminal block 201 to V2H EVSE CONNECTED decision block 203, method 200 determines whether or not a subject vehicle is operatively connected to an EVSE (e.g., a charging plug has been coupled to a charging port of the vehicle). Detecting the operative coupling of an EVSE charging plug to a vehicle charging port may include a vehicle controller sensing a presence and/or a change in a predefined proximity voltage that is transmitted through a proximity voltage terminal of the charging port to a proximity pilot (PP) pin of the charging plug. In the absence of a charging plug, for example, the subject vehicle may sense a predefined proximity voltage (e.g., approximately 5V PROX signal) across the proximity voltage terminal using a J-coupler resistance divider. In the presence of a charging plug, the subject vehicle senses that this signal has changed (e.g., PROX<<5V) to confirm it is plugged into a vehicle charger. For a bidirectional V2H EVSE, the vehicle may sense a unique voltage signal due to the different size resistors in the V2H coupler; this signal is not dependent upon grid power. If an EVSE charging plug has not been coupled to the vehicle charging port (Block=NO), method 200 may advance to DISABLE DARK START process block 205 and command the resident RESS to not discharge AC power to the EVSE.

Upon detecting the operative coupling of the subject vehicle to an EVSE (BLOCK 203=YES), method 200 responsively determines whether or not a main electric power supply to the EVSE is experiencing a power outage event. For instance, EVSE CONTROL PILOT SIGNAL decision block 207 of FIG. 2 determines whether or not the EVSE is actively transmitting a Control Pilot (CP) signal (e.g., 12V at 1 kHz) through the charging plug to the vehicle's charging port. In FIG. 1, the vehicle ECU 22 may affirmatively detect a power outage by sensing an absence of a control pilot signal output by the EVCS 12 through a control pilot pin of the charging plug 38 to a mated control pilot terminal of the charging port 36. When the EVCS 12 is actively outputting a CP signal, there is no grid outage; however, if the EVCS 12 is not outputting a CP signal there is no AC voltage being supplied by the power grid 40 and, thus, the grid 40 is suffering a blackout. If the EVSE is supplying a CP signal (Block 207=YES), method 200 may responsively disable dark start discharge at block 205 and temporarily discontinue at terminal block 223.

After determining that there is likely a power outage (Block 207=NO), method 200 may responsively determine whether or not the EVSE is actively providing a recharging voltage to the subject vehicle. Prior to, contemporaneous with, and/or after detecting an aberration in the PP signal and an absence of a CP signal, for example, EVSE VOLTAGE SUPPLY decision block 209 monitors for and detects the presence or absence of an AC charging voltage being output by the EVCS 12 to the vehicle 10. Recognizing that the absence of a CP signal may be the result of a faulty CP pin or terminal rather than a power outage, the vehicle 10 may attempt to verify that the building 14 is experiencing a power outage by sensing an absence of a recharging voltage output by the EVCS 12 through a single-phase alternating current (AC+) line pin of the charging plug 38 to the traction battery pack 16 by way of a positive (AC+) terminal of the port 36. Upon determining that the EVSE is supplying an AC voltage to the vehicle (Block 209=YES), method 200 may responsively disable dark start discharge at block 205 and temporarily discontinue at terminal block 223.

Upon confirming that there is a power outage (Block 209=NO), method 200 may proceed to V2H BACKUP ENABLED decision block 211 and responsively determine whether or not a V2G discharging mode, which enables a vehicle to discharge a backup power feed, is activated on the subject vehicle. As noted above, for example, an owner, driver, occupant, or other authorized individual (collectively "user") of vehicle 10 may be notified of the power outage and may employ an available user input device, such as telematics unit 26 of FIG. 1, to manually select activation of V2H RPF dark start backup power mode. Alternatively, the vehicle 10 may default to actively participate in VGI/V2H activities; in this instance, decision block 211 may be altogether omitted from method 200 or the user may be prompted to approve participation in dark start backup power. It may also be desirable that the vehicle ECU 22 concurrently determine whether or not the mated EVSE is an in-home bidirectional electric vehicle charging station with V2H-compatible discharging hardware. If dark start backup power mode is not enabled and/or the EVSE is not V2H-compatible (Block 211=NO), method 200 may responsively disable dark start discharge at block 205 and temporarily discontinue at terminal block 223.

Responsive to a detected power outage concurrent with an operatively connected vehicle with active dark start backup power (Block 211=YES), method 200 executes LOW-VOLTAGE POWER process block 213 during which the subject vehicle discharges a metered feed of LV power to the EVSE to enable the EVSE to operate during the outage. According to the example presented in FIG. 1, the vehicle ECU 22 may coordinate operation of the traction battery pack 16 and bidirectional OBC 24 to discharge an uninterrupted auxiliary power feed (e.g., ~24 VAC at ~3 A) through the charging port 36 and charging plug 38 that is sufficient to power the EVCS 12. Once received, the EVCS's LV power module 48 transmits uninterrupted and metered portions of the auxiliary power feed to power both the EVCS controller 50 and the MID controller 56.

After commencing the discharge of auxiliary power feed to the EVSE, method 200 confirms that the vehicle is communicatively connected to the now-powered EVSE, as indicated at V2H COMM CONNECTION process block 215. For instance, vehicle ECU 22 may monitor a CP frequency along with duty cycle data transmitted to the vehicle 10 through charging plug 38. In particular, the vehicle ECU 22 may recheck the CP signal in much the same way as described above with reference to decision block 207 to verify that there is a live connection with a now-online EVCS 12. When connected, the ECU 22 may check the EVCS's duty cycle settings for maximum discharge parameters (e.g., dark start discharge voltage and current limits).

In conjunction with the operations carried out for process block 215, method 200 may execute CP SIGNAL TIMEOUT decision block 217 to determine whether or not a CP signal has been received by the vehicle from the EVSE within a predefined window of time. Recognizing that the EVCS 12 may be faulting or the charging plug 38 may be malfunctioning, for example, the vehicle ECU 22 may access resident cache memory to callup a predefined CP signal time limit (e.g., X-number of minutes) following discharge of the auxiliary power feed. Method 200 may then loop between process block 215 and decision block 217 to determine whether or not a CP signal is received from the EVCS 12 prior to expiration of the CP signal time limit. Responsive to a determination that a CP signal was not received prior to expiration of the predefined CP signal time limit (Block 217=YES), the vehicle ECU 22 may disable the traction battery pack 16 discharging a backup power feed at STOP AC DISCHARGE process block 219; method 200 may then conclude at terminal block 223.

Upon receipt of a CP signal, method 200 may execute FREQUENCY 1 CHECK decision block 221 to determine whether or not a frequency of the CP signal indicates a charging session request. By way of example, vehicle ECU 22 may monitor a frequency of the CP voltage across the corresponding CP voltage terminal of the charging port 36. When the monitored CP frequency (e.g., 1000 Hz) corresponds to the frequency characteristic of a PEV charging session (Block 221=YES), ECU 22 may responsively disable the battery pack 16 from discharging a backup power feed at process block 219. Concurrent with determining that the monitored CP frequency does not fall in range of the frequency needed for a charging session (Block 221=NO), method 200 may execute FREQUENCY 2 CHECK decision block 225 to determine whether or not the frequency of the CP signal is at an optimal discharge rate set by the EVCS's duty cycle. When the monitored CP frequency (e.g., 95 Hz) is not substantially equal to an optimal duty cycle frequency (e.g., 166 Hz) (Block 225=NO), method 200 may responsively loop back to process block 215.

When the monitored CP frequency (e.g., 160 Hz) is within a predefined range (e.g., 152 Hz to 183 Hz) of the duty cycle's optimal frequency (e.g., 166 Hz) (Block 225=YES), method 200 may responsively execute DARK START BACKUP POWER process block 227 and concomitantly command the vehicle to discharge a feed of backup power. After confirming that the vehicle 10 of FIG. 1 is both communicatively and electrically connected to the EVCS 12, for example, the vehicle ECU 22 may coordinate operation of the traction battery pack 16 and bidirectional OBC 24 to discharge a HV backup power feed (e.g., 240 VAC) at the confirmed frequency (e.g., 166 Hz) to the EVCS 12 and, via EVCS 12 and MSP 42, to the building 14. It may be desirable that the auxiliary power feed output by the EVCS 12 have a low voltage level of about 50 V or less and a low amperage level of about 10 A or less, whereas the backup power feed has a high voltage level of about 240 V or more and a high amperage level of about 32 A or more. At OUTAGE MONITOR decision block 229, the method 200 determines whether or not the power outage is ongoing; if not (Block 229=NO), the method 200 may end at terminal block 223. If the power outage continues (Block 229=YES), the method 200 may loop back to process block 215.

Figure 3:
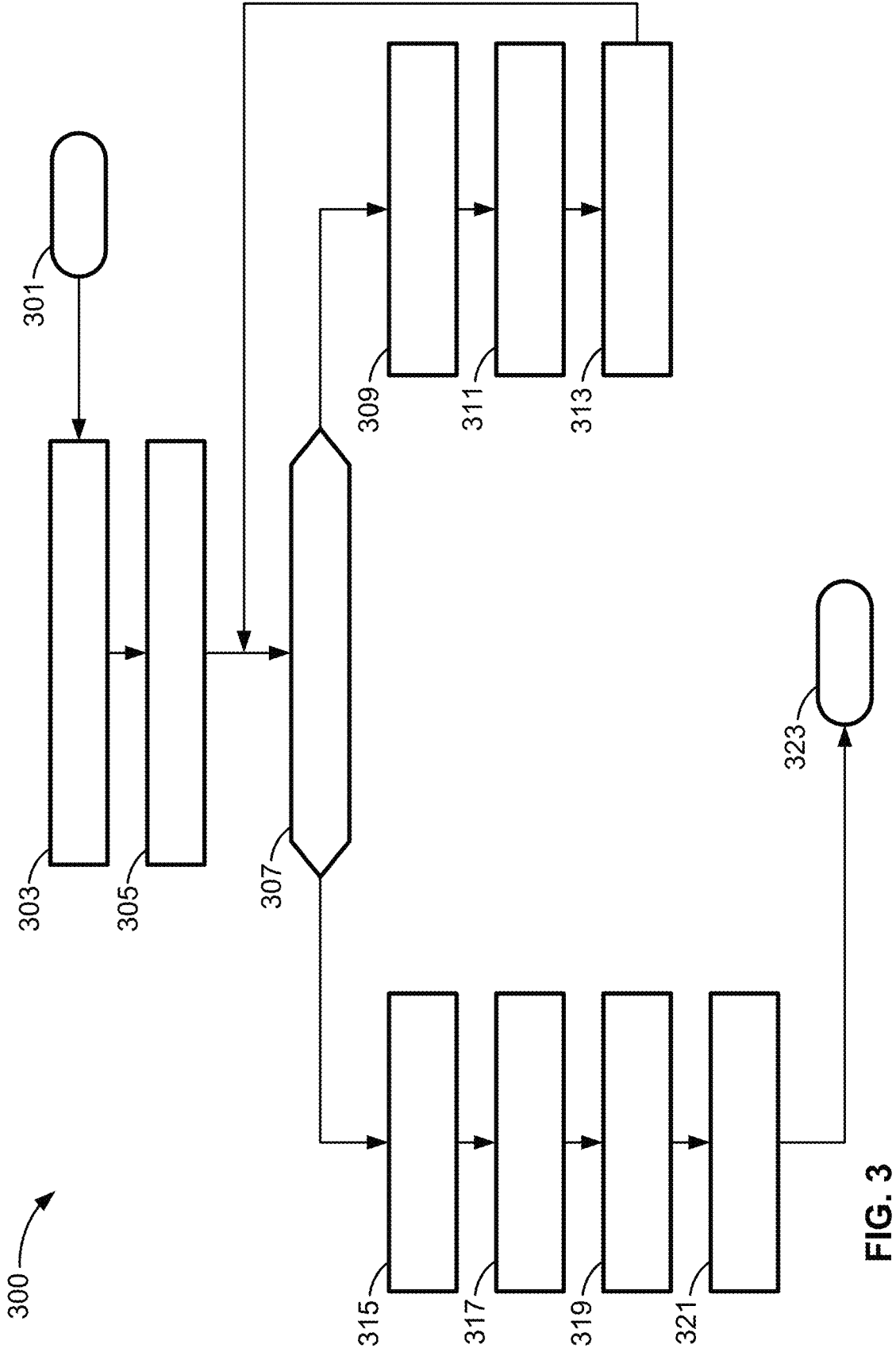
FIG. 3 is a flowchart illustrating a representative EVSE control protocol for coordinating dark-start backup power from a plug-in electric vehicle during a power outage, which may correspond to memory-stored instructions that are executable by a resident or remote microcontroller, control-logic circuit, system control module, or other integrated circuit (IC) device or network of circuits/modules/micro-controllers/IC devices (collectively "controller") in accor-dance with aspects of the disclosed concepts.

Turning next to FIG. 3, method 300 begins at START terminal block 301 with memory-stored, processor-executable instructions for facilitating a dark start backup power operation by a vehicle with an onboard RESS and V2H RPF functionality. In accord with the illustrated examples, terminal block 301 may be initiated contemporaneous with LOW-VOLTAGE POWER process block 213 of FIG. 2. In this regard, method 301 advances from terminal block 301 to EVSE POWER ON process block 303 at which the EVSE receives the feed of LV auxiliary power from the vehicle. At this juncture, the EVCS controller 50 of FIG. 1 may command the main-line electrical contactor(s) 52 remain in an open state. Method 300 thereafter executes MID POWER ON process block 305 at which the MID receives a portion of the auxiliary power feed from the EVSE. Once powered on, the MID may determine whether or not the main power source to the EVSE is experiencing a power outage, as indicated at GRID ON/OFF decision block 307. At this juncture, the MID may report the operating status of the main power source to the EVSE.

Upon determining that the main power source to the EVSE is experiencing a power outage (GRID OFF), method 300 may responsively execute MID DISCONNECT process block 309. In FIG. 1, for example, the MID controller 56 may open the main-line electrical contactor(s) 58 and thereby disconnect the building 14 from the grid 40. Once disconnected, method 300 may proceed next to EVSE DISCHARGE START REQUEST process block 311, at which the EVSE may set a CP frequency to request discharge of a high-voltage (e.g., 240 VAC) backup power feed from the dark start-enabled vehicle. After transmitting the request for backup power, the EVSE may enable transmission of the HV backup power feed at EVSE DISCHARGE RECEIPT process block 313. At this juncture, the EVCS controller 50 of FIG. 1 may command the main-line electrical contactor(s) 52 to close in order to electrically connect the traction battery pack 16 to the MSP 42. Method 300 may then loop back to decision block 307 to determine if/when the main power source to the EVSE is no longer experiencing a power outage.

After determining that the main power source to the EVSE is not/no longer experiencing a power outage (GRID ON), method 300 may responsively execute EVSE DISCHARGE STOP REQUEST process block 315, at which the EVSE may set a CP frequency to request the cessation of HV backup power being fed from the vehicle. Advancing to EVSE DISCHARGE STOP process block 317, the EVSE may disable further transmission of the HV backup power feed. At this juncture, the EVCS controller 50 of FIG. 1 may command the main-line electrical contactor(s) 52 to open or remain open in order to electrically disconnect the traction battery pack 16 from the MSP 42. At DARK START END process block 319, the EVSE may inform the MID that discharge of the backup power feed has ended. Method 300 may responsively execute MID CONNECT process block 321; the MID controller 56 of FIG. 1, for example, may close or maintain closed the main-line electrical contactor(s) 58 and thereby reconnect the building 14 to the grid 40. Method 300 may thereafter advance to END terminal block 323 and temporarily terminate or, optionally, may loop back to terminal block 301.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol, or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating a motor vehicle having a vehicle body, a vehicle battery assembly attached to the vehicle body, and a vehicle charging port attached to the vehicle body and electrically connected to the vehicle battery assembly, the method comprising:

detecting, via a vehicle controller mounted inside a vehicle body of the motor vehicle, coupling of a charging plug of an electric vehicle supply equipment (EVSE) to the vehicle charging port, wherein detecting the coupling of the charging plug includes sensing a change in a predefined proximity voltage transmitted through a proximity pilot pin of the charging plug;

determining, via the vehicle controller responsive to the detected coupling of the charging plug to the vehicle charging port, the EVSE is a bidirectional electric vehicle charging station (EVCS) with vehicle-to-home discharging hardware;

detecting, via the vehicle controller of the motor vehicle responsive to the detected coupling of the charging plug to the vehicle charging port, occurrence of a power outage of a main electric power supply to the EVSE;

commanding, via the vehicle controller responsive to the detected power outage, the vehicle battery assembly to discharge an auxiliary power feed to the EVSE to thereby power the EVSE;

determining, via the vehicle controller after the discharge of the auxiliary power feed to power the EVSE, the motor vehicle is communicatively connected to the EVSE; and commanding, via the vehicle controller responsive to determining the motor vehicle is communicatively connected to the EVSE, the vehicle battery assembly to discharge a backup power feed, greater than the auxiliary power feed, to the EVSE.

2. The method of claim 1, wherein detecting the power outage includes sensing an absence of a control pilot (CP) signal output by the EVSE through a control pilot pin of the charging plug.

3. The method of claim 1, wherein detecting the power outage includes sensing an absence of a recharging voltage output by the EVSE through a single-phase alternating current (AC) line pin of the charging plug to the vehicle battery assembly.

4. The method of claim 1, further comprising determining, via the vehicle controller responsive to the detected power outage, whether or not a vehicle-to-home discharging mode enabling the discharge of the backup power feed is activated on the motor vehicle.

5. The method of claim 1, wherein determining the motor vehicle is communicatively connected to the EVSE includes receiving a control pilot (CP) signal output by the EVSE through a control pilot pin of the charging plug.

6. The method of claim 5, further comprising:

determining, via the vehicle controller after the discharge of the auxiliary power feed, a predefined CP signal time limit;

determining whether or not the CP signal is received from the EVSE prior to expiration of the predefined CP signal time limit; and disabling, via the vehicle controller responsive to the CP signal not being received prior to expiration of the predefined CP signal time limit, the vehicle battery assembly from discharging the backup power feed.

7. The method of claim 5, further comprising:

determining, via the vehicle controller after the discharge of the auxiliary power feed, a CP frequency of the CP signal output by the EVSE;

determining if the CP frequency is within a predefined CP frequency range; and disabling, via the vehicle controller responsive to the CP frequency not being within the predefined CP frequency range, the battery assembly from discharging the backup power feed.

8. The method of claim 1, further comprising transmitting, via the EVSE, the auxiliary power feed to a microgrid controller of a microgrid interconnect device (MID) to thereby power the microgrid controller, the MID interposed between and selectively electrically connecting the EVSE and the main electric power supply.

9. The method of claim 8, further comprising:

determining, via the MID controller responsive to receipt of the auxiliary power feed, occurrence of the power outage of the main electric power supply to the EVSE; and transmitting, via the MID controller responsive to determining the occurrence of the power outage, an open command signal to a set of MID contactors to thereby electrically disconnect the EVSE from the main electric power supply.

10. The method of claim 1, wherein the auxiliary power feed has a low voltage level of about 50 volts (V) or less and a low amperage level of about 10 amps (A) or less, and wherein the backup power feed has a high voltage level of about 240 V or more and a high amperage level of about 32 A or more.

11. A non-transient, computer-readable medium storing instructions executable by one or more processors of a vehicle controller mounted inside a vehicle body of a vehicle, the vehicle including a vehicle body, a battery assembly attached to the vehicle body and a charging port attached to the vehicle body and electrically connected to the battery assembly, the instructions, when executed by the one or more processors, causing the vehicle controller to perform operations comprising:

detecting a coupling of a charging plug of an electric vehicle supply equipment (EVSE) to the charging port of the vehicle, the detecting of the coupling including sensing a change in a predefined proximity voltage transmitted through a proximity pilot pin of the charging plug;

determining, responsive to the detected coupling of the charging plug, the EVSE is a bidirectional electric vehicle charging station (EVCS) with vehicle-to-home discharging hardware;

detecting a power outage of a main electric power supply to the EVSE in response to the detected coupling of the charging plug to the charging port;

commanding the battery assembly to discharge an auxiliary power feed to the EVSE to thereby power the EVSE in response to the detected power outage;

determining the vehicle is communicatively connected to the EVSE after the discharge of the auxiliary power feed to power the EVSE; and commanding the battery assembly to discharge a backup power feed, greater than the auxiliary power feed, to the EVSE in response to determining the vehicle is being communicatively connected to the EVSE.

12. A motor vehicle, comprising:

a vehicle body;

a plurality of road wheels attached to the vehicle body;

a traction motor attached to the vehicle body and configured to drive one or more of the road wheels to thereby propel the motor vehicle;

a traction battery pack attached to the vehicle body, electrically connected to the traction motor, and configured to selectively power the traction motor;

a bidirectional onboard charger (OBC) attached to the vehicle body, electrically connected to the traction battery pack, and configured to convert a direct current (DC) voltage output by the traction battery pack to an alternating current (AC) voltage;

a vehicle charging port attached to the vehicle body, electrically connected to the traction battery pack via the bidirectional OBC, and configured to mate with a charging plug of an electric vehicle supply equipment (EVSE); and a vehicle controller attached to the vehicle body and programmed to:

detect the charging plug of the EVSE coupling to the vehicle charging port by sensing a change in a predefined proximity voltage transmitted through a proximity pilot pin of the charging plug;

in response to the detected coupling of the charging plug to the vehicle charging port, determine the EVSE is a bidirectional electric vehicle charging station (EVCS) with vehicle-to-home discharging hardware;

in response to the detected coupling of the charging plug to the vehicle charging port, detect occurrence of a power outage of a main electric power supply to the EVSE using the charging plug coupled to the vehicle charging port;

in response to the detected power outage, command the traction battery pack to discharge an auxiliary power feed through the bidirectional OBC, the vehicle charging port, and the charging plug, to the EVSE to thereby power the EVSE;

after the discharge of the auxiliary power feed to power the EVSE, determine the motor vehicle is communicatively connected to the EVSE; and in response to determining the motor vehicle is communicatively connected to the EVSE, command the traction battery pack to discharge a backup power feed, greater than the auxiliary power feed, through the bidirectional OBC, the vehicle charging port, and the charging plug, to the EVSE.

13. The motor vehicle of claim 12, wherein detecting the power outage includes sensing an absence of a control pilot (CP) signal output by the EVSE through a control pilot pin of the charging plug.

14. The motor vehicle of claim 12, wherein detecting the power outage includes sensing an absence of a recharging voltage output by the EVSE through a single-phase alternating current (AC) line pin of the charging plug to the traction battery pack.

15. The motor vehicle of claim 12, wherein determining the motor vehicle is communicatively connected to the EVSE includes receiving a control pilot (CP) signal output by the EVSE through a control pilot pin of the charging plug.

16. The motor vehicle of claim 15, wherein the vehicle controller is further programmed to:

determine a predefined CP signal time limit after the discharge of the auxiliary power feed;

determine whether or not the CP signal is received from the EVSE prior to expiration of the predefined CP signal time limit; and in response to the CP signal not being received prior to expiration of the predefined CP signal time limit, disable the traction battery pack from discharging the backup power feed.

17. The motor vehicle of claim 15, wherein the vehicle controller is further programmed to:

determine a CP frequency of the CP signal output by the EVSE after the discharge of the auxiliary power feed by the traction battery back to the EVSE;

determine if the CP frequency is within a predefined CP frequency range; and in response to the CP frequency not being within the predefined CP frequency range, disable the traction battery pack from discharging the backup power feed.

18. The motor vehicle of claim 12, wherein the vehicle controller is further programmed to determine, responsive to the detected power outage, whether or not a vehicle-to-home discharging mode enabling the discharge of the backup power feed is activated on the motor vehicle.

19. The motor vehicle of claim 12, wherein the auxiliary power feed has a low voltage level of about 50 volts (V) or less and a low amperage level of about 10 amps (A) or less, and wherein the backup power feed has a high voltage level of about 240 V or more and a high amperage level of about 32 A or more.

* * * * *